(No Model.)
C. A. BRYANT.
BAIL LOCK.
No. 420,491. Patented Feb. 4, 1890.
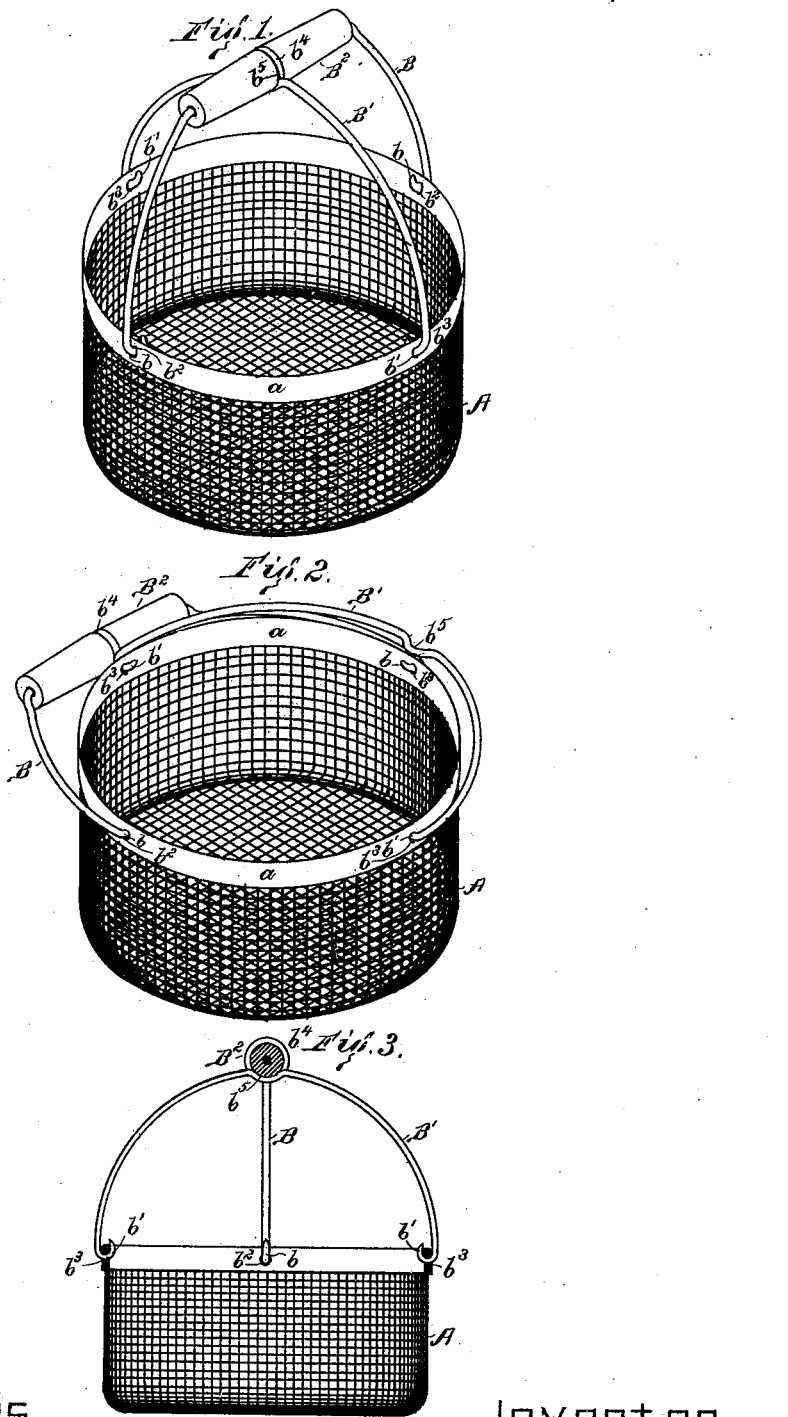
Witnesses
Kirkley Hyde.
Myrtie C. Beals
Inventor
Charles A. Bryant,
By Albert M. Moore,
His Attorney.

UNITED STATES PATENT OFFICE.

CHARLES A. BRYANT, OF WAKEFIELD, MASSACHUSETTS, ASSIGNOR TO WOODS, SHERWOOD & CO., OF SAME PLACE.

BAIL-LOCK.

SPECIFICATION forming part of Letters Patent No. 420,491, dated February 4, 1890.

Application filed September 26, 1888. Serial No. 286,438. (No model.)

*To all whom it may concern:*

Be it known that I, CHARLES A. BRYANT, a citizen of the United States, residing at Wakefield, in the county of Middlesex and Commonwealth of Massachusetts, have invented a certain new and useful Improvement in Bail-Locks, of which the following is a specification.

My invention relates to bail-locks for pails, baskets, and similar vessels; and it consists in the improvement hereinafter described and claimed, the object of which is to enable the swinging bails or handles of such pails, baskets, or vessels to be supported rigidly in a vertical position or to be knocked down to the top of such vessels to occupy less space in storage and transportation.

In the accompanying drawings, Figure 1 is an isometric view of a wire basket having its bail supported in a vertical position; Fig. 2, an isometric view of such a basket having its bail bent down to the top of the body of the basket; Fig. 3, a side elevation of the basket shown in Fig. 1, the rim and handle of the same being in vertical transverse section through the middle thereof.

The body A of the basket is of the usual form and is represented as made of wire and provided with a sheet-metal rim $a$ in a well-known manner.

The basket, instead of being provided with a single bail, is provided with two bails B B', each provided with hooks $b$ $b'$, which are passed through holes $b^2$ $b^3$ in the rim $a$ in the usual manner, the holes $b^2$, which receive the hooks $b$ of the bail B, being in a vertical plane which is nearly or substantially at right angles to the vertical plane in which are arranged the holes $b^3$, which receive the hooks $b'$ of the other bail B'. One B of the bails reaches over the other when the bails are in a vertical position, (see Figs. 1 and 3,) and may be provided with a wooden handle B² in the usual manner. Each bail is provided in the middle with a notch $b^4$ $b^5$, or equivalent bend, the notch in each bail being in that surface which is contiguous to the other bail when the bails are in their raised position, and the bails are substantially of the same height when raised, so that each bail springs into the notch of the other bail and each bail holds the other in a vertical position. When the handle B² is used, the notch $b$ is of course made in the middle of said handle, that being the middle of the bail B, and as said handle is made to turn freely on said bail the notch in the handle is formed entirely around the handle—that is, is an annular groove. When the bails are both raised, as shown in Figs. 1 and 3, the bails are rigid and the wire basket may be used as a flour-sifter; but when the bails are turned down, as shown in Fig. 2, a series of such baskets may be "nested" or placed one within the other and thus stored in a much smaller compass than would be possible with similar baskets having rigid handles.

The device above described is also useful in holding erect the swinging bails of vessels used to contain hot liquids, enabling such bails to be grasped with less danger of burning the fingers, and may be applied to any vessel having a swinging bail which for any reason it is desired to maintain in an erect position at times and at other times to turn down to or below the rim of such vessel.

I claim as my invention—

The combination of a vessel and two swinging bails pivoted to the rim thereof in different vertical planes, and each provided with a notch or bend adapted to engage and hold in position the other of said bails, as and for the purpose specified.

In witness whereof I have signed this specification, in the presence of two attesting witnesses, this 19th day of September, A. D. 1888.

CHARLES A. BRYANT.

Witnesses:
ALBERT M. MOORE,
MYRTIE C. BEALS.